(12) United States Patent
Alamsetty et al.

(10) Patent No.: US 8,317,464 B2
(45) Date of Patent: Nov. 27, 2012

(54) REVERSE FLOW TOLERANT SPRING ACTIVATED BRUSH SEAL

(75) Inventors: Rakesh V. Alamsetty, Andhra Pradesh (IN); William E. Adis, Scotia, NY (US); Mahendra S. Mehra, Karnataka (IN); Nestor Hernandez Sanchez, Schenectady, NY (US); Rajasekar Natarajan, Karnataka (IN); Akshay A. Datye, Karnataka (IN)

(73) Assignee: General Electric Company, Schenectady, NY (US)

( * ) Notice: Subject to any disclaimer, the term of this patent is extended or adjusted under 35 U.S.C. 154(b) by 542 days.

(21) Appl. No.: 12/706,102

(22) Filed: Feb. 16, 2010

(65) Prior Publication Data

US 2011/0200432 A1     Aug. 18, 2011

(51) Int. Cl.
*F04D 29/10*     (2006.01)
(52) U.S. Cl. ............... 415/170.1; 415/230; 415/231; 277/355
(58) Field of Classification Search ............... 415/173.3, 415/231, 174.2; 277/355
See application file for complete search history.

(56) References Cited

U.S. PATENT DOCUMENTS

| 5,944,320 | A | 8/1999 | Werner et al. |
| 6,226,975 | B1 * | 5/2001 | Ingistov ..................... 60/772 |
| 6,352,263 | B1 | 3/2002 | Gail et al. |
| 7,413,194 | B2 * | 8/2008 | Wright et al. ............. 277/355 |
| 2003/0080510 | A1 * | 5/2003 | Dinc et al. ............... 277/355 |
| 2003/0102630 | A1 * | 6/2003 | Dinc et al. ............... 277/355 |
| 2008/0203671 | A1 * | 8/2008 | Addis ........................ 277/355 |
| 2009/0039604 | A1 * | 2/2009 | Beichl et al. ............. 277/355 |

FOREIGN PATENT DOCUMENTS

EP     1244881 B1     6/2005

* cited by examiner

*Primary Examiner* — Allana Lewin
*Assistant Examiner* — Aaron Jagoda
(74) *Attorney, Agent, or Firm* — Ernest G. Cusick; Frank A. Landgraff

(57) ABSTRACT

A reverse flow tolerant brush seal arrangement for restricting the transfer of a pressurized fluid between a first and a second chamber along a moving shaft. Opposing backing plates are provided to stiffen brush bristle alignment on the moving shaft. Differential pressure between the chambers is aided by spring biasing to seat axial movement of a sliding brush seal against one of the opposing backing plates for stiffening to maintain a design clearance with a shaft being sealed.

20 Claims, 8 Drawing Sheets

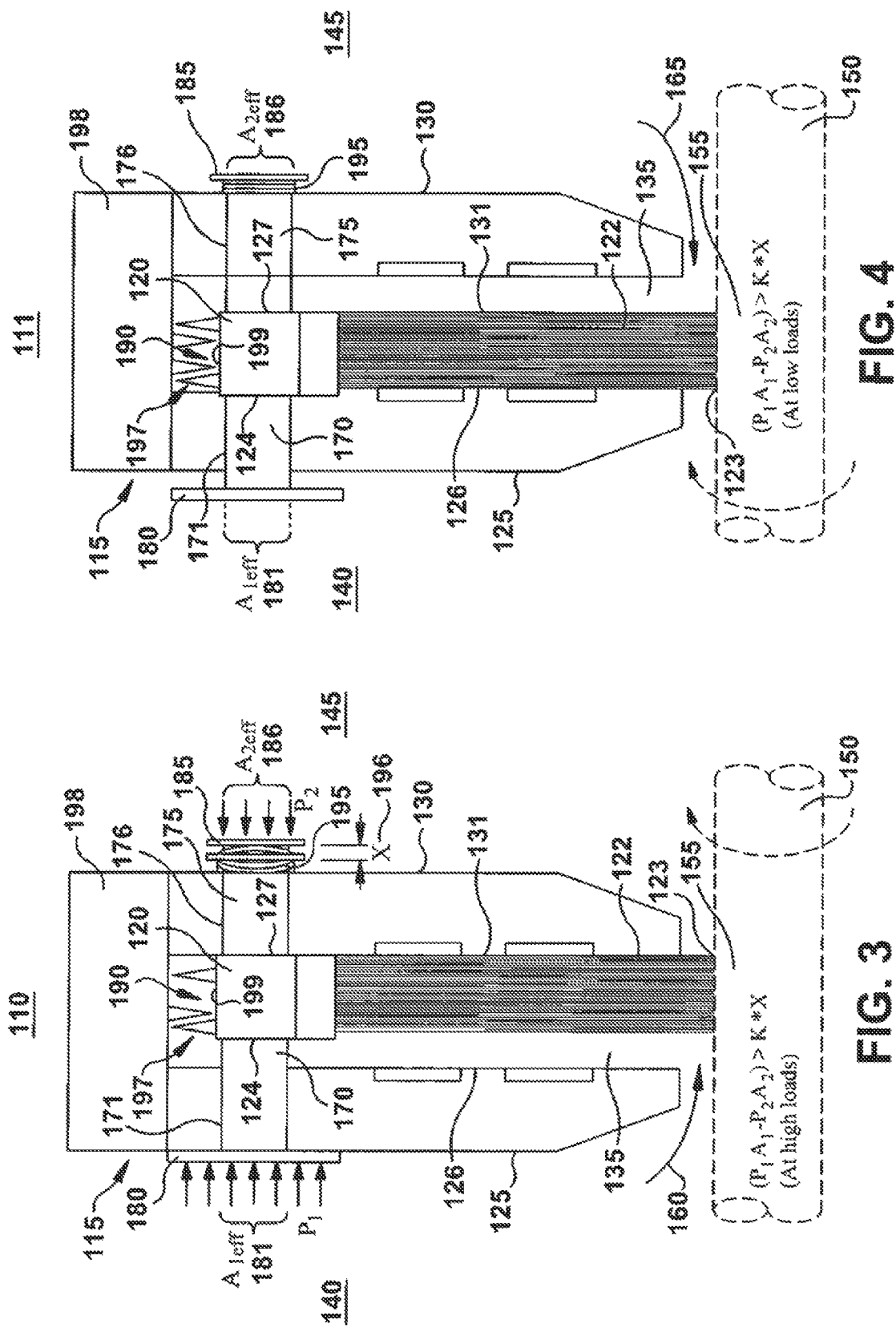

REVERSE FLOW TOLERANT SPRING ACTIVATED BRUSH SEAL

BACKGROUND OF THE INVENTION

The invention relates generally to restricting the flow of a fluid between two pressurized chambers and more specifically to a reverse flow tolerant brush seal for restricting a flow of fluid between pressurized chambers of a turbomachine.

Turbomachines, such as gas turbines and steam turbines, employ bladed rotors in a turbine section to convert thermodynamic energy from the fluids such as pressurized steam, compressed air and combustion gases into mechanical energy for rotating one or more centrally mounted shafts. The shafts, in turn, provide power to aircraft, heavy equipment, waterborne vehicles and electrical power generators. The interfaces between adjacent engine components in turbomachines are sealed in various ways to restrict leakage of fluids such as the pressurized steam, compressor air and combustion gases. There are many interfaces between rotating and stationary components in such turbomachines. Sealing these interfaces presents challenges due to the excessive fluid temperatures and pressures, combined with relative axial and/or radial movement between the engine components. Generally, sealing of these interfaces is done using various types of seals like labyrinth seals and honeycomb seals.

A brush seal is an advanced seal that provides an alternative to labyrinth or honeycomb seals. The seal is comprised of thousands of densely packed wire filaments (bristles) fused between two metallic plates. Bristles with a flexible end bridge a gap between adjacent components and any relative movement is absorbed through deflection of the bristles. Brush seals are very effective because they have minimum effective clearance during normal operation. The tortuous path through the bristles achieves the restriction effect even as the gap distance changes. Brush seals offer many advantages when compared with traditional seals. Unlike the labyrinth seal, a brush seal is designed to come in contact with a rotor to provide a positive seal.

Brush seal bristles are also susceptible to deflection due to fluid pressure loading. For this reason, back plates support the bristles along a majority of their length. The bristles are loaded against the back plate by the fluid pressure, thus preventing permanent deflection. The side plates may be scalloped where they contact the bristles to provide a space for bristle flexure and to allow any frictional heat to dissipate out of the bristles.

But previous fleet experience shows that brush seals are ineffective during the reverse flow operations, such as startups, due to lifting of bristles and thereby opening up of clearances. Brush seals are designed to have the bristles continuously loaded in one direction, against the back plates. Brush seals are most effectively used in applications where a continuous pressure differential exists. If a brush seal is installed in reverse or an unanticipated flow reversal occurs, the unsupported bristles will deflect under pressure. The bristles get lifted up since there is no plate to support bristles in reverse flow direction.

Bristle deflections eventually yield the bristle ends, reducing their sealing effectiveness and rendering them unacceptable for continued service. Reduced brush seal effectiveness will increase fluid leakage, fuel usage and, consequently, increase operating costs until the brush seal is replaced. Removal and disassembly of a turbomachine for brush seal replacement is both costly and time consuming.

FIG. 1 illustrates a radial side sectional view of a prior art brush seal 10 for sealing a rotating shaft. The brush seal 10 includes a housing 15 for mounting a brush holder 20. The housing includes a front plate and a backing plate for seating brush seal bristles 22. The bristles 22 are seated against the support surface 35 or 31 of the back plate 30 when a higher pressure $P_1$ is present in a first chamber 40 on one axial side of the brush seal 10 relative to the pressure P2 in a second chamber 45 on the second axial side of the brush seal. The housing is positioned to support the bristles in proximity to movable shaft 50. The brush seal bristles 22 are held in position against surface 55 of the movable shaft 50 to minimize the leakage flow 60 created by this pressure differential.

Experience shows that flow reversals occur under certain turbomachine operating conditions, thus precluding the use of brush seals in certain applications. FIG. 2 illustrates a radial side sectional view of a the prior art seal brush when, due to an operating condition of the turbomachine, pressure $P_2$ of the second chamber 45 on the second axial side of the brush seal is higher than the pressure $P_1$ of the first chamber 40 on the first axial side. The pressure differential forces a lower end of the bristles 22 off the support surface 35 of backing plate 30 increasing clearance 70 between the end of the bristles 22 and the surface 55 of the moving shaft 50. The increased clearance 70 allows a reverse flow 65 much larger than desired, resulting in a commensurate loss of high-energy fluid and efficiency of the turbomachine.

For steam turbines, brush seals are very effective at providing sealing during normal operation with sealing steam flow oriented in the one direction for the installed brush seals. However, during reverse flow conditions such as startup, shutdown, trips and operation on the turning gear, the brush seal may be ineffective at sealing the reverse flow, hence requiring more auxiliary steam and a larger auxiliary boiler size to provide sealing steam.

Attempts have been made to improve brush seal effectiveness such as Addis in US2008/0203671 by employing at least two in-series brush seal stages with a mechanism to allow the high pressure fluid to bypass an upstream bristle stage and properly load the downstream bristle stage against a backplate. Such a mechanism may be costly and undesirable due to the need for two brush seal stages. Also it requires a longer axial space, which will increase the bearing span.

Accordingly, it would be desirable to provide a brush seal that is tolerant of flow reversals.

BRIEF DESCRIPTION OF THE INVENTION

According to a first aspect of the present invention, a first embodiment of a reverse flow tolerant brush seal for restricting a transfer of a pressurized fluid between a first chamber and a second chamber is provided. The brush seal includes an annular housing including a first backing plate and a second opposing backing plate mounted together with a cavity situated between. Multiple brush seal arm sectors are provided. Each brush seal arm sector is adapted for suspending a brush with a plurality of seal bristles within the cavity. Multiple sliding brush seal mechanisms are provided. Each sliding brush seal mechanism is adapted for positioning the brush seal arm sector in the cavity seated at opposing backing plates in response to a differential pressure between the first chamber and the second chamber. Means are provided for preferentially positioning the brush seal sliding mechanism to seat the brush against one of the first backing plate and the second backing plate in response to a differential pressure between first chamber and the second chamber.

According to a second aspect of the present invention, a further embodiment of a reverse flow tolerant brush seal for restricting a transfer of a pressurized fluid between a first chamber and a second chamber is provided. The brush seal includes an annular housing including a first backing plate and a second opposing backing plate mounted together with a cavity between. The first backing plate including a first support surface and the second backing plate includes a second support surface. Multiple brush seal arm sectors are provided. Each brush seal arm sector is adapted for suspending a brush with a plurality of seal bristles within the cavity. An annular chamber is disposed radially at an outer end of the cavity and disposed axially between the first backing plate and the second backing plate.

Multiple sliding brush seal mechanisms are provided. Each sliding brush seal mechanism is adapted for positioning a brush seal arm sector in the cavity to be seated on one of the opposing backing plates in response to a differential pressure between the first chamber and the second chamber. Means are provided for preferentially positioning the multiple brush seal sliding mechanisms to seat the brush against one of the first backing plate and the second backing plate in response to a differential pressure between first chamber and the second chamber.

In accordance with a further aspect of the present invention, a turbomachine with at least one reverse tolerant brush seal is provided. The turbomachine includes a rotor, a casing, and a working fluid employed within the casing to impart rotary motion to the rotor. At least one reverse flow tolerant brush seal applied to the turbomachine for sealing flow of the working fluid between at least one of two chambers of the turbomachine.

The brush seal includes an annular housing including a first backing plate and a second opposing backing plate mounted together with a cavity between. Multiple brush seal arm sectors are provided. Each brush seal arm sector is adapted for suspending a brush with a plurality of seal bristles within the cavity with an end of the brush at a design clearance with respect to the rotor. Multiple sliding brush seal mechanisms are provided. Each multiple sliding brush seal mechanism is adapted for seating one of the brush seal arm sectors in the cavity between opposing backing plates. Means are provided for preferentially sliding the plurality of brush seal sliding mechanisms to seat the brush against one of the first backing plate and the second backing plate in response to a differential pressure between first chamber and the second chamber.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 illustrates an embodiment of the inventive brush seal including spring activation for sliding the brush seal holder in response to a differential pressure for normal operating conditions;

FIG. 4 illustrates an embodiment of the inventive brush seal including spring activation for sliding the brush seal holder in response to a differential pressure for reverse flow conditions;

It should be understood that part numbers assigned to parts in one drawing may be assigned to corresponding parts in succeeding drawings.

DETAILED DESCRIPTION OF THE INVENTION

Figure 1:
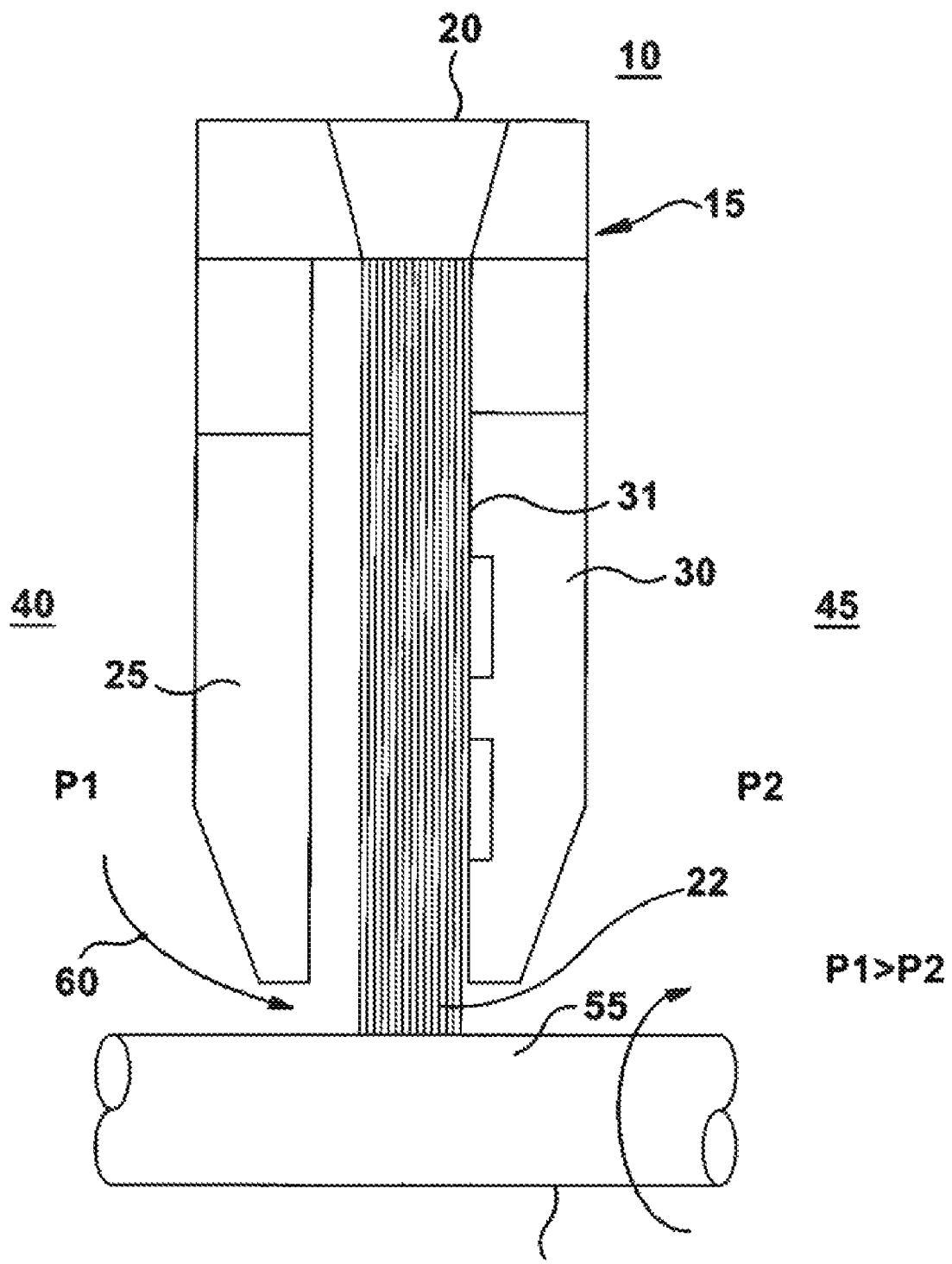
FIG. 1 illustrates a prior art brush seal seated on a back plate for sealing a shaft from a leakage flow due to a forward differential pressure.
Figure 2:
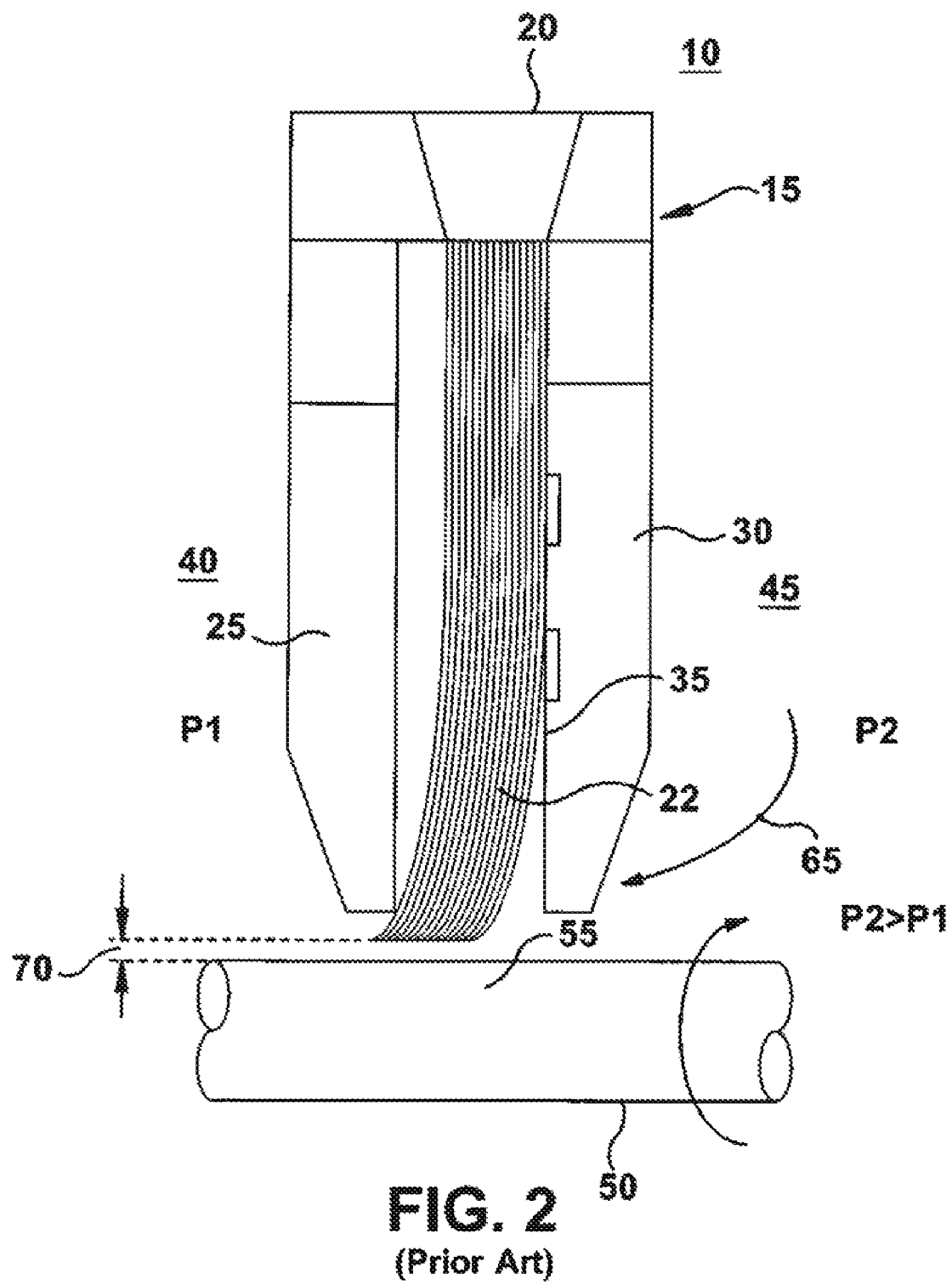
FIG. 2 illustrates a prior art brush seal with an increased clearance due to a reverse differential pressure.

The following embodiments of the present invention have many advantages, including providing a brush seal that is responsive to sealing leakage flows from both sides of brush seal in response to changing directions of the pressure differential between the opposing sides of the seal. The ability to seal against leakage from both sides makes the seal effective during a wide range of operating conditions for a turbomachine, preventing loss of operating fluids and saving energy. The mechanism is based on spring actuation creating an axial movement of the sector arm over which the bristles are welded. The sector arm could be of any shape and size depending on the force balance requirements described later. In application for brush seals on steam turbine, the present invention reduces shaft flow leakages during reverse flow conditions and lowers auxiliary steam requirements during transient loads like startups, shutdowns, trips, turning gear operations. This reduces overall steam turbine auxiliary steam requirement during startup, shutdowns, trips and turning gear operations, thereby reducing the auxiliary boiler cost for the operator.

A first embodiment of the present invention provides a brush seal that is slidingly movable along an axial direction of the rotor shaft to allow the brush seal to seal in opposite axial directions in response to alternating differential pressures across the seal. During forward flow, a first pressure exists in a first chamber on a first axial side of the seal. A second pressure exists in a second chamber on a second axial side of the seal. Herein the chamber is given broad meaning and may include a space open to ambient. The differential pressure between the first and second chambers acts to force a flow from the high-pressure side to the low-pressure side. Under normal operating conditions pressure in the first chamber acts against a spring load to move the seal bristles against a first backing plate, which supports the bristles and maintains the brush seal design effective clearance to prevent leakage flow under normal conditions. Under reverse flow conditions, where pressure in the second chamber exceeds pressure in the first chamber, a higher pressure in the second chamber than in the first chamber acts in concert with the spring force to seat the bristles axially against an opposed backing plate that then supports the bristles and maintains the brush clearance to prevent leakage under reverse flow conditions. Effectiveness in reverse flow direction will help in reducing auxiliary steam requirement during startups and hence the auxiliary boiler size. The actuation of the bristles with the help of the spring may be replaced with bellows, bourdon tubes, inflatable tubes and cams for other embodiments of the present invention.

FIG. 3 illustrates a first embodiment of the present invention of a reverse flow tolerant spring actuated brush seal. The inventive brush seal restricts a transfer of a pressurized fluid between a first chamber and a second chamber and may include front facing and back facing support plates, an arm sector to which the bristles may be welded, two pressure plates (P1, P2 with A1, A2 areas respectively) either bolted or welded to end faces of the piston, and a spring arrangement of stiffness K, which is placed in-between the pressure plate and one side of the backing plate.

A housing 115 of the reverse flow tolerant brush seal 110 includes a first backing plate 125 and a second backing plate 130. The first backing plate 125 and the second backing plate 130 include a first support surface 126 and a second support surface 131, respectively, for the brush 122 (bristles) of the brush seal 110. The first backing plates 125 and the second backing plate 130 are arranged in parallel axially with respect to a moving shaft 150 being sealed, with the support surfaces 126, 131 arranged in opposition and establishing an open-ended cavity 135 therebetween. The cavity 135 is open-ended in a radial direction with respect to the moving shaft. The housing 115 is arranged to be mounted between a first chamber 140 and a second chamber 145 of a turbomachine. The moving shaft 150 of the turbomachine extends between the first chamber 140 and the second chamber 145. The housing 115 further may be arranged to physically isolate the ambient pressures, P1 in the first chamber and P2 in the second chamber from each other when mounted around the moving shaft 150. In the case of a turbomachine, the moving shaft 150 may be the rotor of the turbomachine or an extension thereof. The housing 115 may be mounted to a fixed outer casing (not shown) of the turbomachine (not shown), thereby separating the first chamber 140 within the turbomachine and the second chamber 145 outside.

The brush seal 110 may be formed in shape of annulus in order to fit around a circular shaft. The mounting of the brush seal 110 may such that sealing end 123 of the brush 122 effectively seals the moving shaft 150 when the brush seal sliding mechanism seats the brush 122 on the first seating surface 126 or the second seating surface 131.

A brush seal arm sector 120 is adapted for suspending a plurality of seal bristles (brush) 122 within the cavity 135. The brush (bristles) 122 may be welded to the metal arm sector 120. The arm sector 120 may be formed as an arcuate shape arranged to surround a segment of the moving shaft 150. The brush 122 extends from the arm sector inward radially to the rotating shaft to establish a design clearance, which limits leakage. The arm sector 120 is integrated in a sliding brush seal mechanism 190, adapted for positioning the arm sector 120 in the cavity 135 onto the opposing support surfaces 126, 131 may include a first piston 170 disposed at a first end 124 of the arm sector 120 and extending through an axial hole 171 in the first backing plate 125 to the first chamber 140. A second piston 175 may be disposed at a second end 127 of the arm sector 120 and extend through an axial hole 176 in the second backing plate 130 to the second chamber 145. The axial hole 171 in the first backing plate 125 and the axial hole 176 in the second backing plate 130 for accommodating the pistons 170, 175, respectively, are arranged coaxially.

A first plate 180, fixedly connected to an outer end of the first piston 170 and disposed in the first chamber 140, is subject to the pressure of the first chamber. A second plate 185, fixedly connected to an outer end of the second piston 175, and disposed in the second chamber 145 is subject to the pressure of the second chamber. The plates 180, 185 may be attached by bolting, welding or other conventional attachment means. A plurality of plates and the associated piston sections may be provided circumferentially around the annulus of the brush seal enclosing the moving shaft.

The sliding brush seal mechanism 190 may further include means for preferentially sliding the sector arm 120 to seat the brush 122 against the first backing plate 125 or the second backing plate 130 in response to a differential pressure between first chamber 140 and the second chamber 145. The means may include a spring member 195 operably connected to the sliding brush seal mechanism 190 and opposing its travel to seat brush 122 against the first support surface 126 or the second support surface 131. While the spring is illustrated as being placed between the second plate 185 and the second backing plate, it is known that placement of spring devices for biasing such motion may be implemented between the first plate 180 and the first backing plate 125 or at other locations within the sliding brush seal mechanism.

The spring 195 is arranged such that with sufficient pressure in the first chamber 140, relative to the second chamber 145, the spring force is overcome and the brush 122 of the sector arm 120 seats against the support surface 131 of the second backing plate 130. Seating of the brush 122 against the second backing plate 130 seats the brush 122 properly with respect to the surface 155 of the moving shaft 150 and seals against leakage from the first chamber 140 to the second chamber 145. In the absence of sufficient pressure in the first chamber 140 relative to the pressure in the second chamber 145, the spring 195 forces the sliding brush seal mechanism 190 to seat the brush 122 against the support surface 126 of the first backing plate 125. Seating of the brush 122 against the first backing plate 125, provides sealing from leakage directed from the second chamber 145 to the first chamber 140.

Equation 1 represents the forces acting on the sliding brush seal mechanism and tending to seat the brush on the second backing plate:

$$P_1 * A_{1\mathit{eff}} - P_2 * A_{2\mathit{eff}} + \text{Frictional Force (FF)} + \text{Circumferential forces (CF) acting on bristle} > k*X \quad \text{(Equation 1)}.$$

Herein, $P_1$ is the pressure of the first chamber 140; $A_{1\mathit{eff}}$ 180 is an effective area on the first piston 170 acted on by $P_1$; $P_2$ is the pressure of the second chamber 145; $A_{2\mathit{eff}}$ 186 is the effective area on the second piston 175 acted on by $P_2$; k is the spring constant; and X 196 is a predetermined travel of the sliding brush seal mechanism 190 between two support surfaces 126, 131. Under normal operating conditions, the differential force $(P_1*A_{1\mathit{eff}}-P_2*A_{2\mathit{eff}}+FF+CF)$ on the sliding brush seal must be greater than the spring restraining force k*X to cause the travel to the second backing plate 130, Under other operating conditions when pressure in the second chamber 145 is higher than in the first chamber 140, the spring force k*X aids the pressure $P_2$ in the second chamber 145 in seating the brush against the first backing plate 125.

Figure 5:
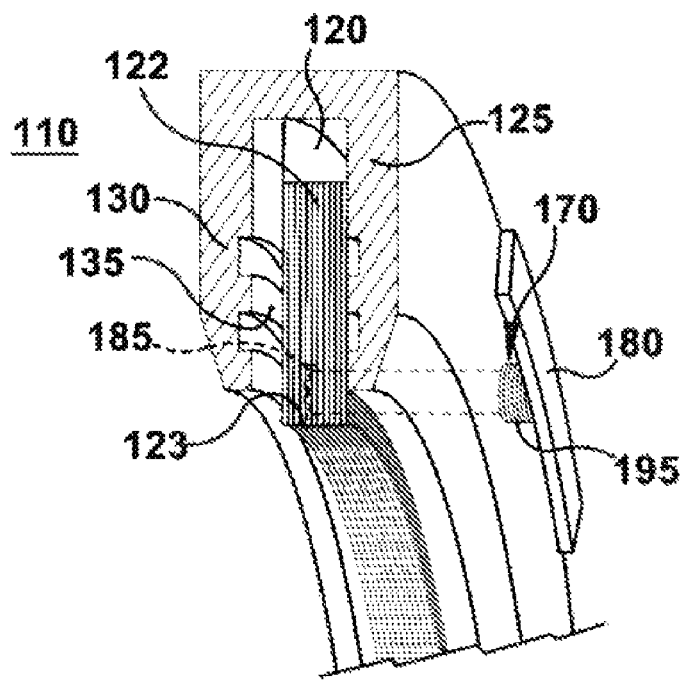
FIG. 5 illustrates an embodiment of the inventive brush seal including a bellows for preferentially sliding the brush seal holder in response to a differential pressure between opposing chambers.
Figure 6:
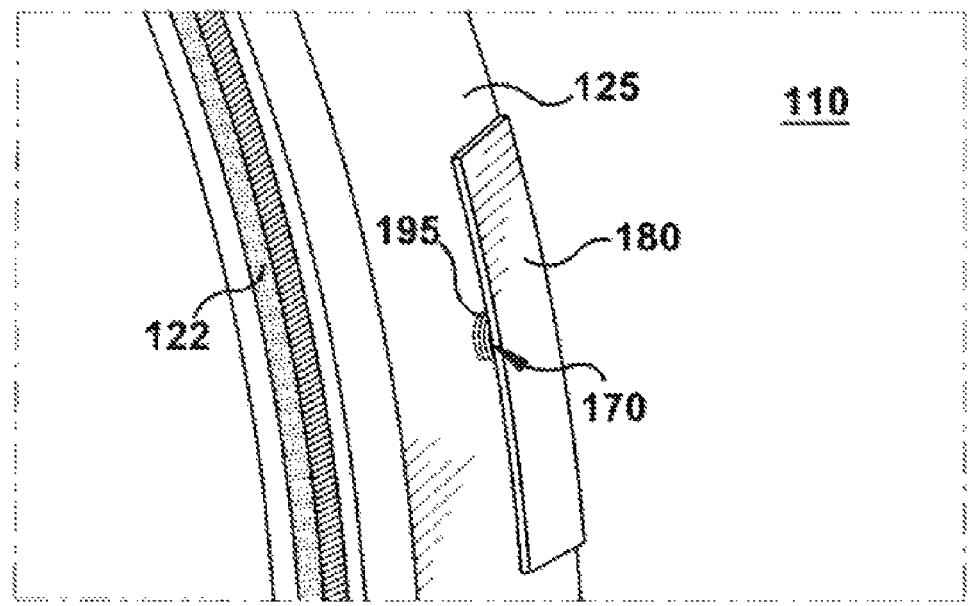
FIG. 6 illustrates an embodiment of the inventive brush seal including opposing cylinders with different operating areas for preferentially sliding the brush seal holder in response to a differential pressure between opposing chambers.

FIGS. 5-6 provide isometric view of an arcuate segment of a reverse flow tolerant brush seal. A first pressure plate with a rectangular geometric shape is shown on one side of the sliding brush seal mechanism. The rectangular plate is connected to piston extending through first backing plate and attached to arm sector. A pressure plate of circular geometric shape is shown connected to piston extending through the second backing plate to the arm sector. However the plate shapes need not be limited to any particular geometry. The brush is seated against the first backing plate with the brush end extending inward radially from the cavity.

Figure 7:
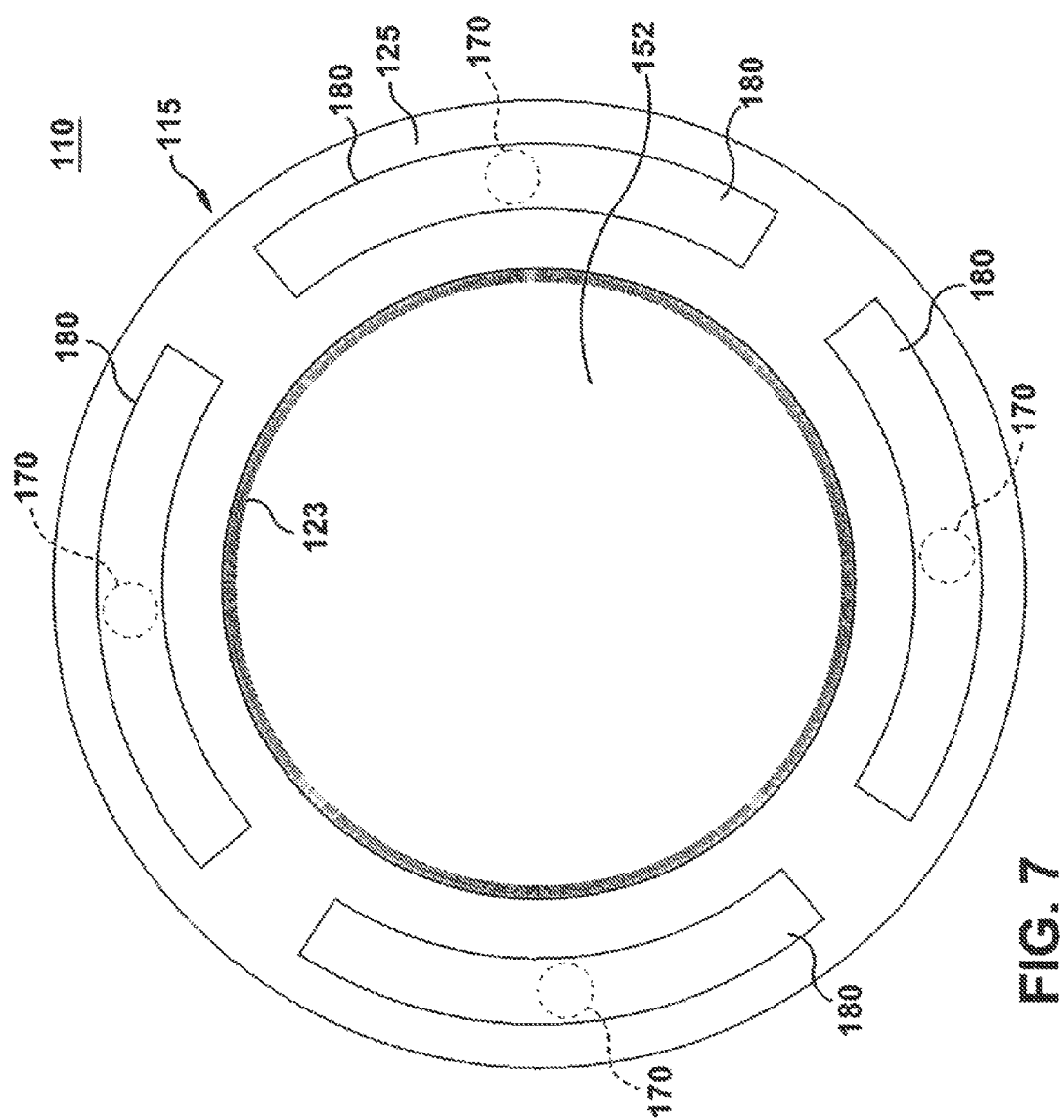
FIG. 7 provides a radial-end view of the reverse tolerant brush seal housing.

FIG. 7 provides a radial-end view of the reverse tolerant brush seal housing 115. The end view of the housing 115 includes the first backing plate 125 surrounding the central opening 152 for a moving shaft (not shown). The ends 123 of the brush 122 of the multiple internal brush sectors (not shown) extend inward radially from the housing 115. The first pressure plates 180 for the sliding brush seal mechanisms of the multiple internal brush sectors (not shown) are located circumferentially around the first backing plate 125. A first piston 170 is connected axially behind each first pressure plate 180 is operably connected an internal brush sector (not shown).

Another aspect of the present invention may include a seal 197 between an upper end closure 198 and a top surface 199 of the sector arm 120. The seal limits potential bypass flow over the top of the sector arm during the transitions between seating on the first backing plate 125 and seating on the second backing plate 130.

As an example of the application of the reverse tolerant brush seal to a steam turbine, the first chamber may be within the turbine casing and the second chamber may be ambient outside the rotor shaft. During normal operation, pressure in the turbine casing at the end of the shaft will be higher than outside pressure forcing the sliding brush seal to travels a distance X against spring force to the second backing plate, thereby supporting the bristles that maintains the brush seal design effective clearance. This also keeps the spring attached at pressure plate P2 in tension.

During the reverse flow condition (such as a startup condition), the force acting on pressure plate P1 is less when compared to that of spring force and hence the spring force overcomes the pressure force and move the spring back to a position which makes the brush to move to the other end. This helps the brush to get the backing support from first backing plate, maintaining the effective clearance same as in forward flow i.e. the first backing plate will provide backing support during reverse flow condition.

Figure 8:
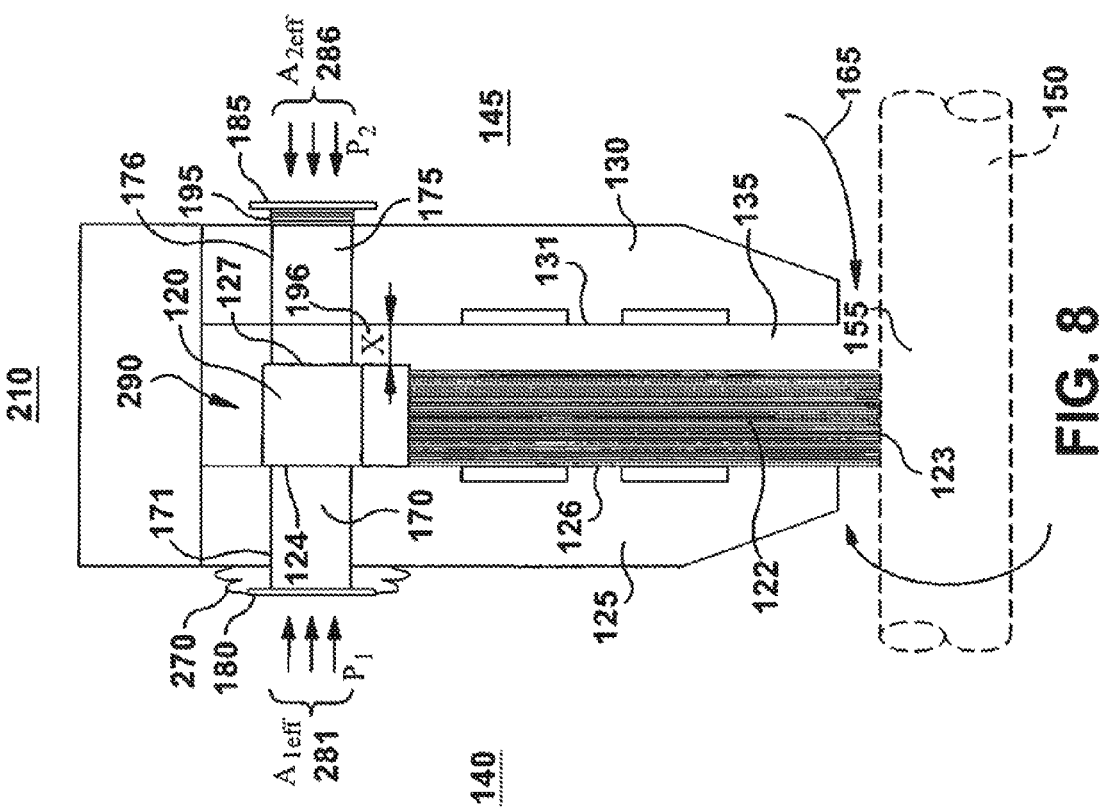
FIG. 8, illustrates use of a bellows for controlling positioning of a sliding brush seal mechanism.

In another embodiment of the present invention as illustrated in FIG. 8, the means for preferentially sliding the arm sector 120 may include a bellows member 270. The bellows member may be operably connected to the first piston 170 of the sliding brush seal mechanism 290 and may oppose its travel to seat the brush against the second support surface 131 in accordance with Equation 1 above, where $P_1$ is the pressure of the first chamber 140; $A_{1\mathit{eff}}$ 281 is an effective area of the bellows 270 acted on by $P_1$; $P_2$ is the pressure of the second chamber 145; $A_{2\mathit{eff}}$ 286 is the effective area on the second piston 175 acted on by $P_2$; k is the bellows constant; and X is the travel of the sliding brush seal mechanism 290 between two support surfaces 126, 131.

Figure 9:
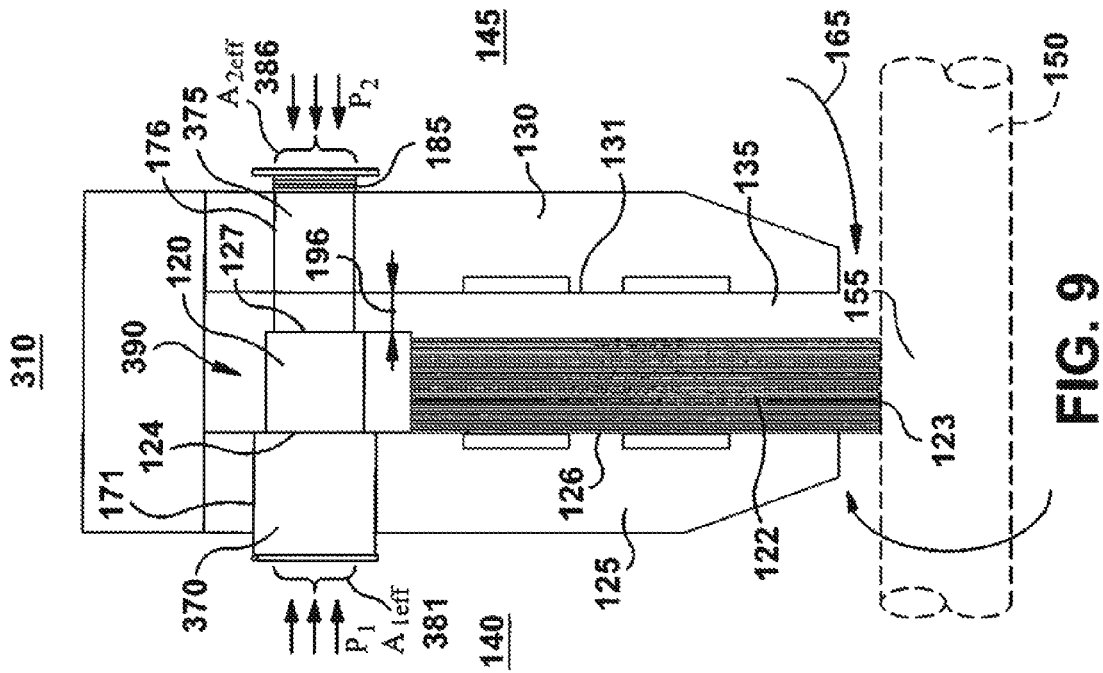
FIG. 9 illustrates use of opposing cylinders with spring for controlling positioning of a sliding brush seal mechanism.

In a further embodiment of the present invention as illustrated in FIG. 9, the means for preferentially sliding the arm sector 120 may include an opposing cylinder arrangement. The opposing cylinders may be fixedly connected at opposing ends of the sliding brush seal mechanism 390 with a restraining spring 195 so as to oppose travel of the brush seal sliding mechanism to seat the brush 122 against the second support surface 131 in accordance with Equation 1 above, where $P_1$ is the pressure of the first chamber 140; $A_{1\mathit{eff}}$ 381 is an effective area of a first cylinder acted on by $P_1$; $P_2$ is the pressure of the second chamber 145; $A_{2\mathit{eff}}$ 386 is the effective area of the second cylinder acted on by $P_2$; k is the spring constant of the restraining spring 195; and X 196 is the travel of the brush 122 between two support surfaces 126, 131.

Further embodiments of the present invention may include with a piezoelectric material, inflatable tubes, bourdon tubes, pneumatic and hydraulic actuation, cams, and electro-magnetic actuators for axial retraction of the piston to change the sector position. The size and shape of the pressure plates, pistons, cylinders, and bellow can also be altered based on the requirements such as size and pressures imposed. A telescopic arm arrangement with the helical spring placed inside the cylinder will serve the purpose of axial movement of brush seal.

Figure 10:
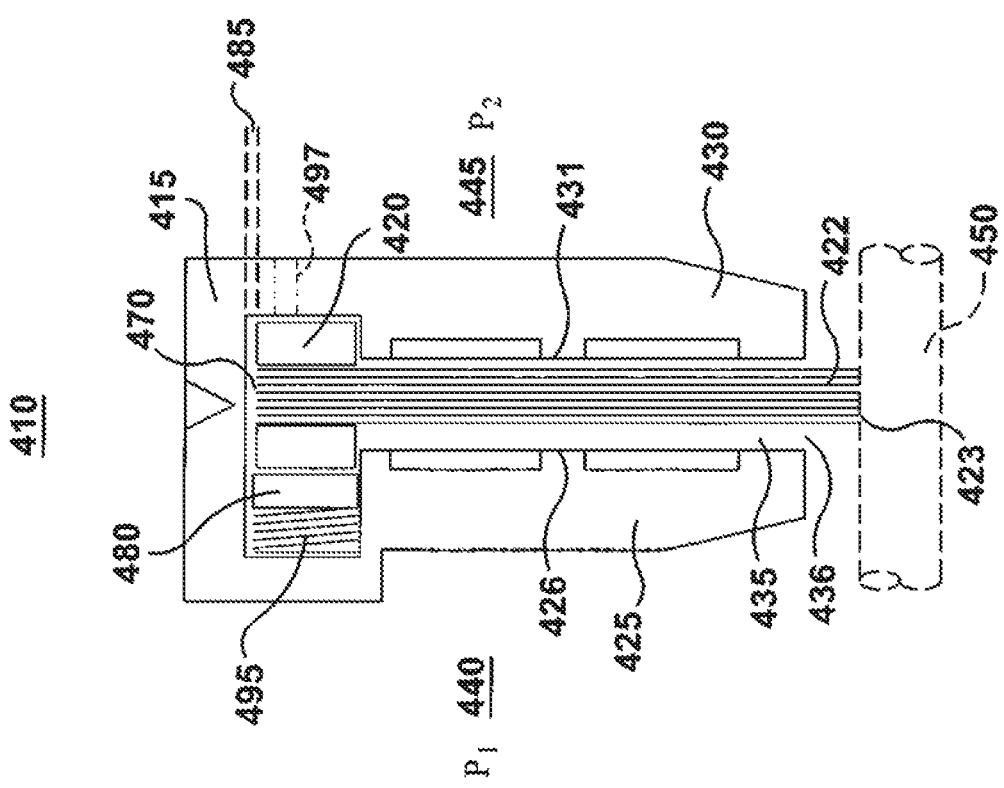
FIG. 10 illustrates another embodiment of the reverse flow tolerant brush seal with a floating brush arrangement.

FIG. 10 illustrates another embodiment of the reverse flow tolerant brush seal 410. A floating brush assembly 420 is provided within a housing 415 that includes an internal cavity 435 with an arcuate plate 480 operated on by a spring 495 to move the floating brush assembly 420 in an axial orientation based on upstream and downstream pressure as illustrated in FIG. 10. The housing 415 includes a first backing plate 425 with a support surface 426 and a second backing plate 430 with a supporting surface 431. The housing 415 includes the open-ended cavity 435 between the opposing backing plates. The open end 436 of the cavity 435 provides for a brush 422 of the brush seal 410 to extend to an external moving shaft 450 for sealing the shaft. The cavity 435 may include an upper annular segment 470. The spring 495, the arcuate plate 480 and the floating brush assembly 420 are housed in the upper annular segment along an axial direction with respect to the external moving shaft 450. The spring 495 acts on the arcuate plate 480 biasing movement of the floating brush assembly 420. A radial clearance 485 is provided between the outer radial surface 470 of the floating brush assembly and an inner radial surface 471 of the housing 415 to allow axial motion of the floating brush assembly. Multiple axial throughholes 497 may be provided at circumferential locations on backing plate 430, exposing the associated side of brush seal assembly 420 to pressure from chamber 445. A further embodiment of the use of a floating brush assembly may include a pocket and a ripple spring in lieu of the spring 495 and arcuate plate 480. Such a pocket and ripple spring may provide a thinner and lower cost assembly.

During normal flow conditions when pressure P1 in the first chamber 440 is greater than pressure P2 in the second chamber 445, spring force from spring 495 overcomes pressure P2 acting on floating brush assembly 420 through holes 497 in to seat the brush 422 against backplate 430. During reverse flow conditions, pressure P2 is greater than pressure P1. Steam at pressure P2 enters through axial holes 497 to pressurize the brush seal assembly 420 around the circumferential span, thereby overcoming the force exerted by the spring 495 in tension. As the spring 495 is compressed the floating brush seal assembly 420 moves towards backing plate 425 and gets it backing support from support surface 426. The number and size of holes 497 to be provided through backplate depends on the force requirement for overcoming tension of spring 495.

Figure 11:
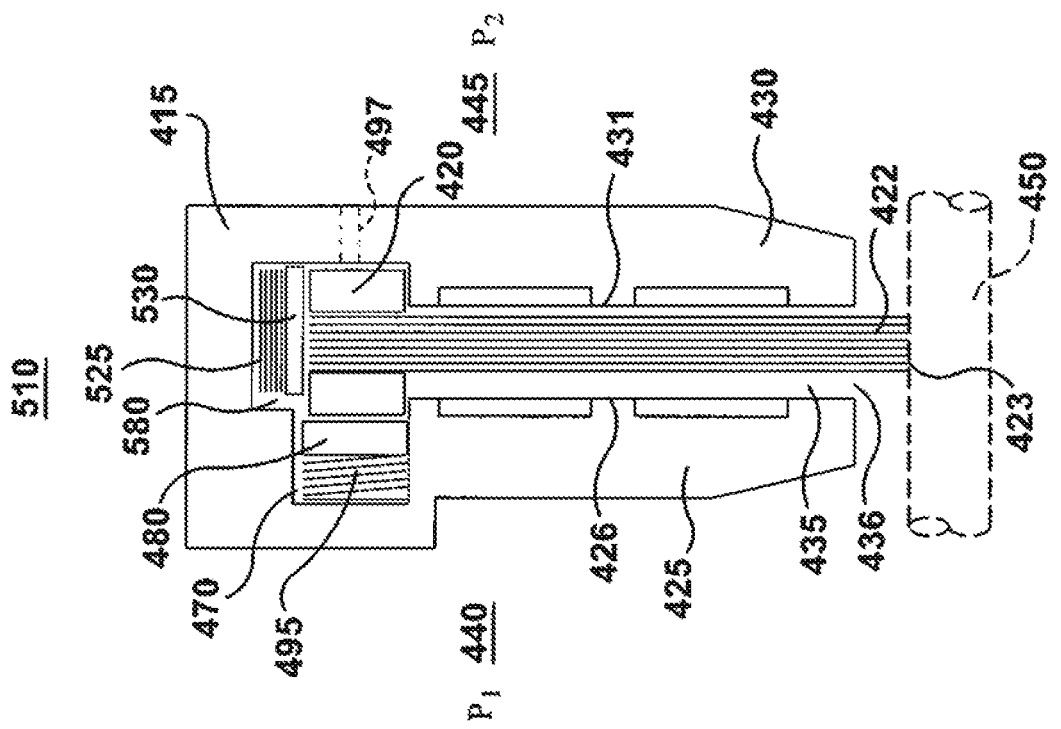
FIG. 11 illustrates a preferred variation of the above embodiment for a reverse flow tolerant brush seal with a floating brush arrangement.

A further variation of the above embodiment for a reverse flow tolerant brush seal 510 is illustrated in FIG. 11. The upper annular segment of cavity includes an expanded radial section 520. Within the radial section 520 is included a radial spring 525 and a rolled plate 530. The spring 525 and rolled plate 530 apply an inward radial force to the floating brush assembly 420 and thereby smooth axial motion in response to the pressure differential between the first chamber 440 and the second chamber 445.

Further, in applications described above where retraction devices like spring, bellows, bourdon gauges, cam etc., are used, the use of such devices may be eliminated if the circumferential force balance on both sides of the bristle surface and on the floating assembly, and the frictional force as a whole is sufficient to float the floating brush seal assembly and provide proper intended backing support based on the flow direction.

Figure 12:
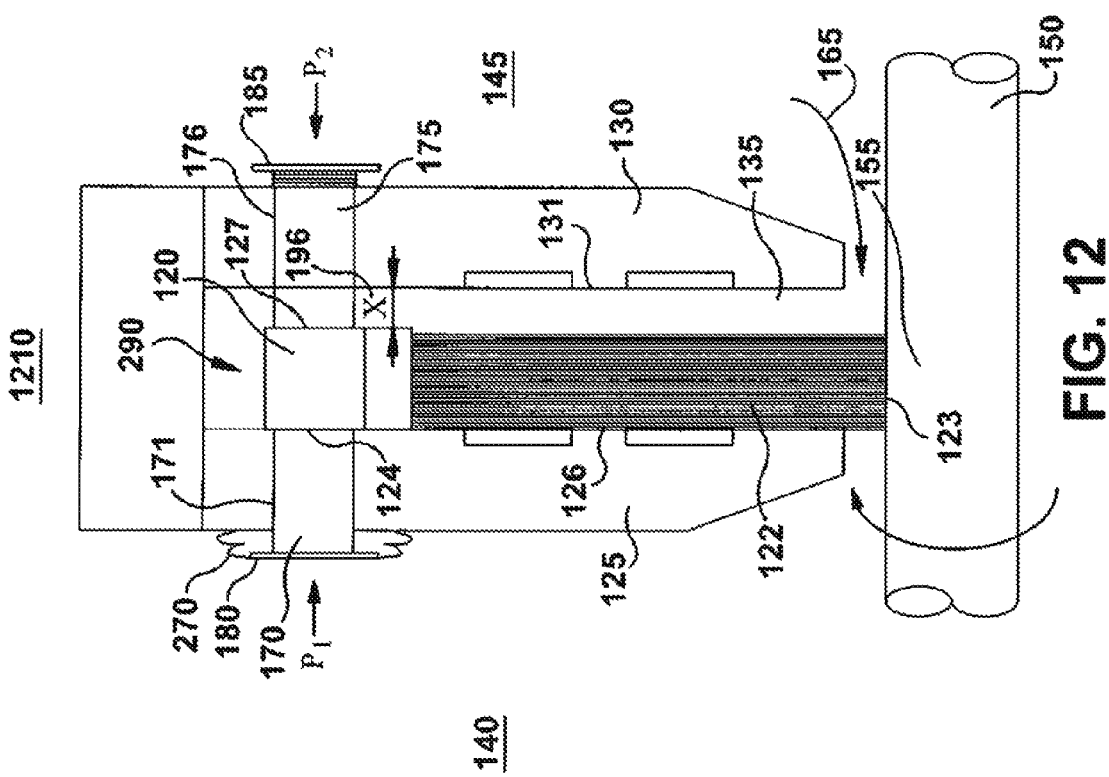
FIG. 12 illustrates a reverse flow tolerant brush seal with a bellows that does not employ spring biasing.

FIG. 12 illustrates a reverse flow tolerant brush seal 1210 with bellows 270 that does not employ spring biasing.

While various embodiments are described herein, it will be appreciated from the specification that various combinations of elements, variations or improvements therein may be made, and are within the scope of the invention.

The invention claimed is:

1. A reverse flow tolerant brush seal for restricting a transfer of a pressurized fluid between a first chamber and a second chamber, the brush seal comprising:
   an annular housing including a first backing plate and a second opposing backing plate mounted together with a cavity therebetween;
   a plurality of brush seal arm sectors, each arm sector adapted for suspending a brush with a plurality of seal bristles within the cavity;
   a plurality of sliding brush seal mechanisms, each sliding brush seal mechanism adapted for positioning the brush seal arm sector in the cavity between opposing backing plates in response to a differential pressure between the first chamber and the second chamber; and
   means for preferentially positioning the brush seal sliding mechanism to seat the brush against one of the first backing plate and the second backing plate in response to a differential pressure between first chamber and the second chamber.

2. The reverse flow tolerant brush seal according to claim 1, the first backing plate including a first support surface and the second backing plate including a second support surface, wherein the first support surface and the second support surface are adapted to support an end of the brush at a design clearance with respect to a shaft being sealed when the brush is seated against the support surface.

3. The brush seal of claim 2, the means for preferentially sliding the brush seal sliding mechanism comprising:
   a spring member operably connected to the sliding brush seal sliding mechanism and opposing travel of the brush seal holder to seat the brush against one of the first support surface and the second support surface.

4. The brush seal of claim 2, means for preferentially sliding the brush seal sliding mechanism comprising:
   a bellows member operably connected to the sliding brush seal holder and opposing travel of the brush seal holder to seat the brush against one of the first support surface and the second support surface.

5. The brush seal of claim 2, the means for preferentially sliding the brush seal sliding mechanism comprising:
   a stepped cylinder arrangement of sliding brush seal holder including a first cylinder of a first end area exposed to the pressure of the first chamber and a second cylinder of a second end area exposed to the pressure of the second chamber wherein the arrangement opposes travel to seat the brush against one of the first support surface and the second support surface.

6. The brush seal of claim 2, the means for preferentially sliding the brush seal sliding mechanism comprising:
   at least one of a bourdon tube, a piezoelectric material, inflatable tubes, bourdon tubes, pneumatic actuation, hydraulic actuation, cams, or electromagnetic actuators.

7. The brush seal of claim 2, further comprising:
   an upper end closure; and
   a seal between the upper end closure and a top surface of the brush seal sector arm.

8. The reverse flow tolerant brush seal according to claim 1, the sliding brush seal mechanism comprising:
   a first piston disposed at a first end of the brush seal arm sector and extending through the first backing plate to the first chamber and a second piston disposed at a second end of the brush seal arm sector and extending through the second backing plate to a second chamber;
   a first pressure plate operably connected to an end of the first piston and disposed in the first chamber subject to the pressure of the first chamber; and
   a second pressure plate operably connected to an opposing end of the second piston and disposed in the second chamber subject to the pressure of the second chamber.

9. The brush seal of claim 1, wherein the plurality of brush seal sector arms are arranged circumferentially around the annular housing.

10. The brush seal of claim 1 including a predetermined travel of the sliding brush seal mechanism between the first support surface and a second support surface according to the relationship:

$$P1*A1 - P2*A2 > K*x$$

wherein P1 is the pressure in the first chamber; P2 is the pressure in the second chamber; A1 is an effective area receiving pressure P1 acting to seat the brush seal holder on the second support surface; A2 is an effective area receiving pressure P2 acting to oppose seating the brush seal holder on the second support surface; K is the spring constant; and x is a predetermined travel of the sliding brush seal sliding mechanism.

11. The brush seal according to claim 1, wherein the housing for the brush seal is mounted to a fixed member such that ends of the brush seal engages the circular shaft at a design clearance when the brush is seated on one of the first support surface and the second support surface.

12. A reverse flow tolerant brush seal for restricting a transfer of a pressurized fluid between a first chamber and a second chamber, the brush seal comprising:
   an annular housing including a first backing plate and a second opposing backing plate mounted together with a cavity therebetween, the first backing plate including a first support surface and the second backing plate includes an opposing second support surface;
   an annular chamber disposed radially at an upper end of the cavity and disposed axially between the first backing plate and the second backing plate, wherein the annular chamber is bounded by an outer radial surface and an inner radial surface
   a floating brush seal assembly disposed within the annular chamber and restrained to axial arcuate motion by the inner radial surface and the outer radial surface of the annular chamber;
   biasing means for seating a brush of the floating brush assembly on the second support surface when pressure in the first chamber is greater than pressure in the second chamber; and
   a plurality of axial pressure ports fluidly connecting the second chamber with the annular chamber of the housing to urge the floating brush seal assembly to seat on the first support surface when pressure in the second chamber is greater than pressure in the first chamber.

13. The reverse flow tolerant brush seal of claim 12, wherein the biasing means includes a ripple spring disposed axially within the annular chamber against a first side of the floating brush seal assembly.

14. The reverse flow tolerant brush seal of claim 12, wherein the biasing means includes:
   at least one spring member disposed axially within the annular chamber; and
   an arcuate plate disposed in the annular chamber between the spring member and a first side of the floating brush seal assembly wherein the spring member biases the floating brush assembly to seat on the second support surface when pressure in the first chamber is greater than pressure in the second chamber.

15. The reverse flow tolerant brush seal of claim 14, further comprising:
a second spring member and a rolled plate disposed in the annular chamber wherein the spring member acting inward radially on the rolled plate urging the sliding brush seal mechanisms to slide smoothly within the annular chamber.

16. A turbomachine comprising:
a rotor;
a casing;
a working fluid employed within the casing to impart rotary motion to the rotor;
at least one reverse flow tolerant brush seal applied to the turbomachine for sealing flow of the working fluid between at least one of two chambers of the turbomachine, the brush seal comprising:
an annular housing including a first backing plate and a second opposing backing plate mounted together with a cavity therebetween;
a plurality of brush seal arm sectors, each adapted for suspending a brush with a plurality of seal bristles within the cavity with an end of the brush at a design clearance with respect to the rotor;
a plurality of sliding brush seal mechanisms, each adapted for seating one of the brush seal arm sectors in the cavity between opposing backing plates; and
means for preferentially sliding the plurality of brush seal sliding mechanisms to seat the brush against one of the first backing plate and the second backing plate in response to a differential pressure between first chamber and the second chamber.

17. The turbomachine according to claim 16, the sliding brush seal mechanisms comprising:
a plurality of first pistons, one first piston disposed at a first end of each brush seal arm sector and extending through the first backing plate to the first chamber;
a plurality of second pistons, one first piston disposed at a second end of each brush seal arm sector and extending through the second backing plate to a second chamber;
a plurality of first pressure plates, each first pressure plate operably connected to an end of the first piston and disposed in the first chamber subject to the pressure of the first chamber; and
a plurality of second pressure plates, each second pressure plates operably connected to an opposing end of the second piston and disposed in the second chamber subject to the pressure of the second chamber.

18. The turbomachine according to claim 16, the means for preferentially sliding the plurality of brush seal sliding mechanisms comprising:
a spring member operably connected to the sliding brush seal sliding mechanism and opposing travel of the brush seal holder to seat the plurality of seal bristles against against one of the first backing plate and the second backing plate.

19. The turbomachine according to claim 16, the means for preferentially sliding the plurality of brush seal sliding mechanisms comprising:
a bellows member operably connected to the sliding brush seal holder and opposing travel of the brush seal holder to seat the plurality of seal bristles against one of the one of the first backing plate and the second backing plate.

20. The turbomachine according to claim 16, the means for preferentially sliding the plurality of brush seal sliding mechanisms comprising:
a stepped cylinder arrangement including a first cylinder of a first end area exposed to the pressure of the first chamber and a second cylinder of a second end area exposed to the pressure of the second chamber wherein the arrangement opposes travel to seat the brush against one of the one of the first backing plate and the second backing plate.

* * * * *